Patented June 21, 1932

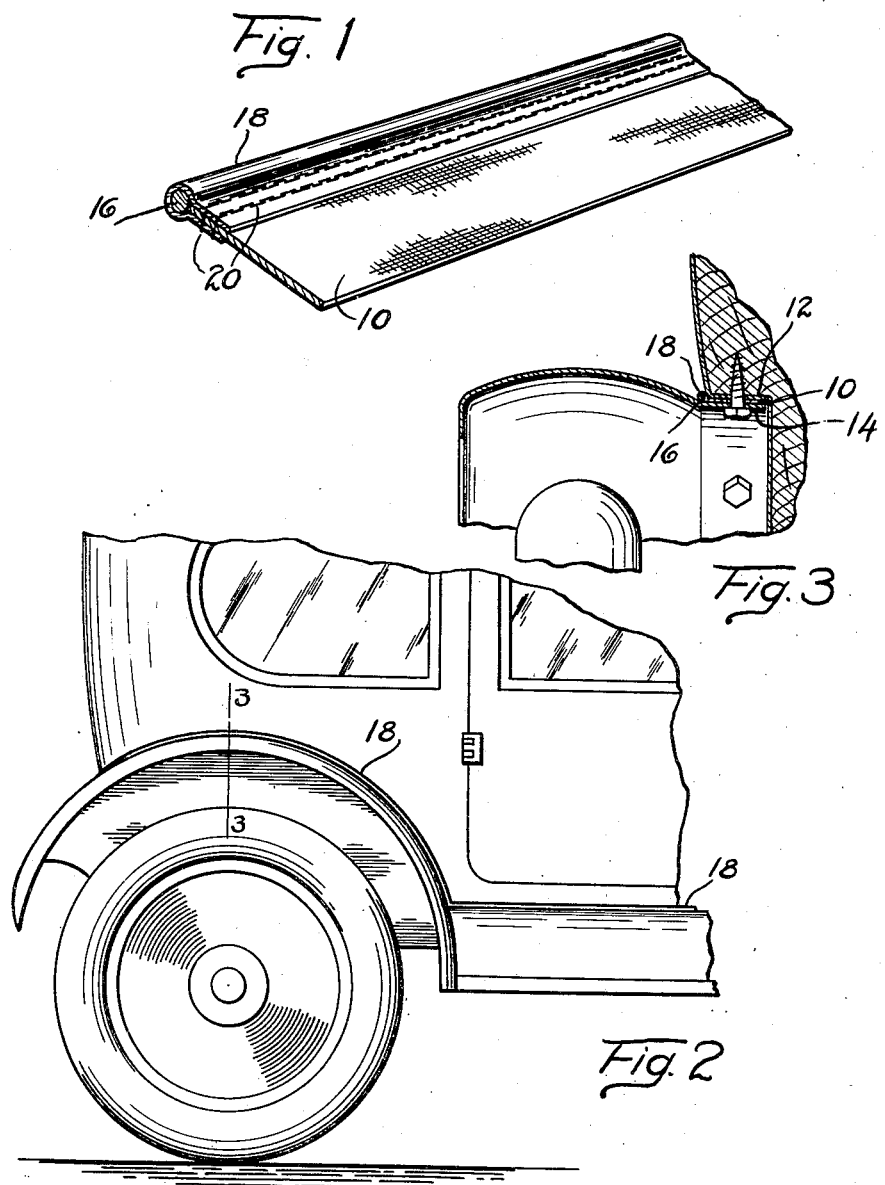

1,864,326

UNITED STATES PATENT OFFICE

EDWARD F. TANNEWITZ, OF DETROIT, MICHIGAN, ASSIGNOR, BY MESNE ASSIGNMENTS, TO DETROIT GASKET & MANUFACTURING COMPANY, OF DETROIT, MICHIGAN, A CORPORATION OF MICHIGAN

ANTISQUEAK AND FINISH STRIP

Application filed July 5, 1928. Serial No. 290,299.

My invention relates to an improved anti-squeak and finish strip particularly adapted for use in the manufacture of automobile bodies.

An object is to provide a strip of this character capable of being interposed between abutting metal surfaces such as between the fender and the body of the vehicle to eliminate objectionable frictional contact of the two metal surfaces which might result in an unpleasant squeaking noise and at the same time to provide a finish bead extending along over the joint formed between the two metal surfaces and which serves not only to prevent the entrance of water and dirt into the joint, which in itself would result in a squeaking noise but also provides an attractive covering bead concealing the joint.

The above objects and others, together with various meritorius features and advantages of my invention, will more fully appear from the following description, appended claim and accompanying drawing, wherein—

Fig. 1 is a perspective of an anti-squeak and finish strip embodying my invention.

Fig. 2 is a fragmentary elevation of a portion of an automobile body carrying my invention, and Fig. 3 is a fragmentary sectional view taken on line 3—3 of Fig. 2.

I provide a flat flexible strip of anti-frictional material indicated as 10, which serves as the anti-squeak packing. This strip may be formed of fabric or it may be of composition material such as ground cork and rubber. It is preferably somewhat compressible and it is pliable, and it possesses anti-frictional properties.

A suitable strip of anti-squeak packing may be made of woven fabric material carrying a lubricant content such as an asphaltum filler and such strip when inserted between two metal surfaces, as between a body surface 12 and a fender 14 provides a packing of anti-squeak material which eliminates the possibility of frictional contact between the two metal surfaces and which is slightly compressible to accommodate for irregularities therein and is suitably flexible to serve its necessary purpose.

This strip of packing material has a piping extending along one longitudinal edge, the cord of which is indicated as 16 and the covering about which cord is indicated as 18. This cord may be of any suitable material— paper might be used—and the covering material is a finish material which preferably has a smooth hard surface such as artificial leather. The cord has a diameter greater than the thickness of the packing strip 10 and extends along one edge of such strip and the covering material is folded thereover and overlaps the opposite sides of the packing strip along its piping edge and is secured thereto in a suitable manner as by stitching 20.

This piping, when the strip is in place as shown in Figs. 2 and 3, conceals the joint formed between the two metal surfaces and protects such joint and forms a finish bead. The piping reinforces and stiffens the edge of the backing strip and increases its thickness so that at such point the joint between the two metal surfaces is completely filled and the covering material of the piping is sufficiently flexible to permit the angular adjustment of the piping with respect to the plane of the packing strip if such is necessary in its place of use.

What I claim is:

An anti-squeak and finish strip comprising a flat flexible strip of packing material carrying a filler possessing lubricating qualities, a piping extending along one edge of said strip consisting of a flexible cord having a diameter greater than the thickness of said strip, and a strip of hard surfaced flexible finishing material folded over said flexible cord and extending in overlapping relation along each side of said packing material strip, said overlapping portions of the finishing material being secured to said strip to position the flexible cord in slightly spaced relation to the edge of the strip.

In testimony whereof, I EDWARD F. TANNEWITZ, sign this specification.

EDWARD F. TANNEWITZ.